Sept. 27, 1949.    J. E. COLLINS ET AL    2,482,840
ELECTRIC MOTOR BRAKE
Filed July 25, 1945

MAGNETIC CIRCUIT DIAGRAM

— INVENTORS —
JOHN E. COLLINS
ALFRED J. MASTROPOLE

BY Herbert L. Davis, Jr.
— ATTORNEY —

Patented Sept. 27, 1949

2,482,840

UNITED STATES PATENT OFFICE 2,482,840

ELECTRIC MOTOR BRAKE

John Edward Collins, Belleville, N. J., and Alfred Joseph Mastropole, New York, N. Y., assignors to Bendix Aviation Corporation, Teterboro, N. J., a corporation of Delaware Application July 25, 1945, Serial No. 607,022

3 Claims. (Cl. 318—372)

The present invention relates to electric motors and actuators and more particularly to a novel electromagnetic braking arrangement effective to stop and lock the output shaft of the motor upon deenergization of the motor.

An object of the invention is to provide a brake actuator armature connected in series with the magnetic circuit of the motor armature.

Another object of the invention is to provide a magnetic brake arrangement in which there is provided extended pole pieces on the yoke end of the pole shoes of the motor so as to operate a brake armature which also serves as a yoke for the pole shoes.

Another object of the invention is to provide a novel brake means for an electric motor which includes an armature to control the braking action and simultaneously the magnetic flux for the motor so as to effect an increase in the magnetic flux upon release of the brake.

Another object of the invention is to provide a novel magnetically operated brake in which the braking action may be effected by the total magnetic flux of the motor so that no increase in the magnetic force is required to operate the brake.

Another object of the invention is to provide a novel arrangement in which the internal magnetic field of an electric motor is utilized to actuate a brake armature for releasing the output shaft of the motor.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

Figure 1:
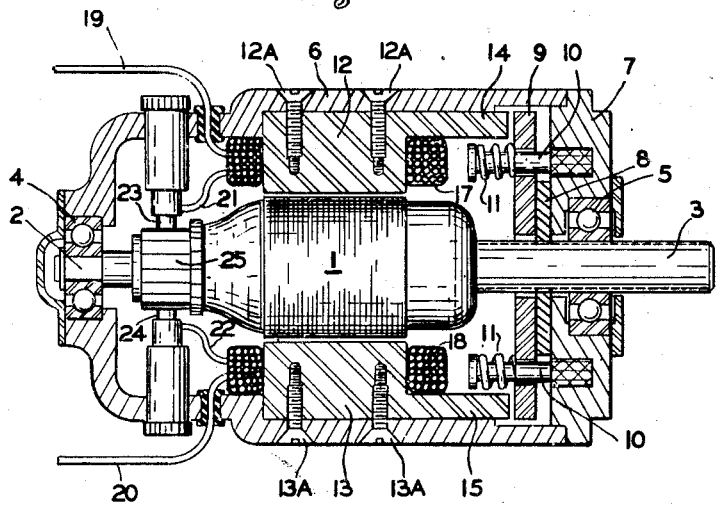
Figure 1 is a sectional view of an electric motor having an electromagnetic brake, constructed according to the present invention.

Referring to Figure 1 the motor consists of a conventionally wound armature 1 having shafts 2 and 3 supported in bearings 4 and 5 which are held in a housing 6 and cover 7. The housing 6 and cover 7 are formed of a suitable non-magnetic material.

One end of the shaft 3 projects through the cover 7 and constitutes the output shaft of the motor. A brake disc 8 engages the output shaft 3 and is axially movable in a suitable slot extending longitudinally in the shaft 3.

The brake disc 8 may be clamped between the inner surface of the housing cover 7 and a pressure plate or brake armature 9 formed of suitable ferro-magnetic material. The plate 9 is secured against turning by means of guide pins 10 fastened by suitable means in the housing cover 7.

The guide pins 10 project through suitable openings in the plate 9 and carry spring members 11 which bias the plate 9 towards the right so that upon de-energization of the motor the brake disc 8 is effectively clamped so as to provide a braking action on the output shaft 3.

The magnetic field structure of the motor includes the pole shoes 12 and 13 formed of suitable ferro-magnetic material. The shoes 12 and 13 are fastened to the housing 6 formed of suitable non-magnetic material by bolts 12A and 13A respectively. While only one pair of pole shoes are shown, it will be readily apparent that additional pairs of pole shoes may be provided.

The pole shoes 12 and 13 have extended pole pieces 14 and 15 positioned in spaced relation to the brake armature plate 9. The brake armature plate 9 forms a yoke arranged to complete a magnetic circuit from the pole shoe 12 through the armature 1, pole shoe 13, pole piece 15, brake armature plate 9, pole piece 14 and returning to pole shoe 12.

The pole shoes 12 and 13 carry suitable field windings 17 and 18 wound in a conventional manner about the respective pole shoes. Electrical conductors 19 and 20 lead from a suitable source of electrical energy to the field coils for effecting energization of the same. Conductors 21 and 22 lead from the field windings 17 and 18 to brushes 23 and 24 carried in suitable insulated holders by the housing 6. The brushes 23 and 24 are arranged to cooperate with commutator segments 25 of the armature 1 in a conventional manner.

Figure 2:
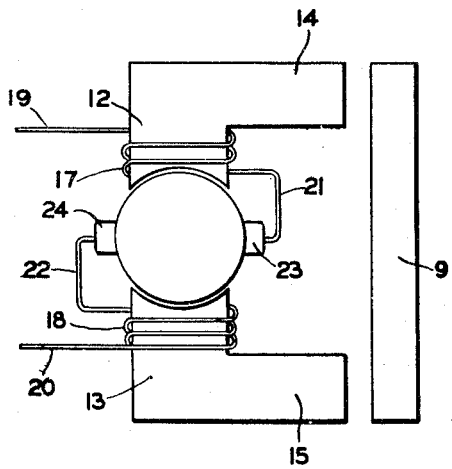
Figure 2 is a schematic view illustrating the brake armature in relationship to the pole shoes of the motor.
Figure 3:
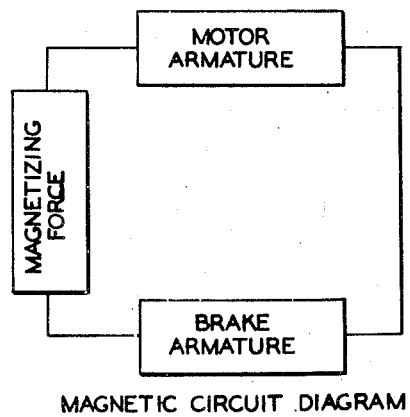
Figure 3 is a diagrammatic view showing the electromagnetic circuit.

As shown in Figures 2 and 3, the brake armature plate 9 is connected in series in the magnetic circuit of the motor and serves as a yoke for completing the circuit.

Moreover since the brake armature plate 9 is held in spaced relation to the pole pieces 14 and 15, the reluctance of the magnetic circuit due to the air gap will be relatively great upon initial energization of the field windings so that the strain placed upon the output shaft 3 and brake disc 8 by armature 1 will be quite slight.

Upon energization of the field windings 17 and 18 the armature plate 9 will be drawn towards the pole pieces 14 and 15 against the force of the springs 11 so as to close the air gap between plate 9 and pole pieces 14 and 15. This latter action causes plate 9 to decrease the reluctance of the magnetic circuit and disengage the brake disc 8 so as to effect rotation of the output shaft 3 under the full magnetic force of the motor.

Upon de-energization of the motor circuit, the springs 11 will bias the armature plate 9 to the right so as to clamp the disc 8 between the plate 9 and the inner surface of the cover 7 and provide a braking action on the output shaft 3.

Although only one embodiment of the invention has been illustrated and described, various changes in the form and relative arrangements of the parts, which will now appear to those skilled in the art, may be made without departing from the scope of the invention. Reference is, therefore to be had to the appended claims for a definition of the limits of the invention.

What is claimed is:

1. An electric motor comprising, in combination, a housing formed of a non-magnetic material, an armature rotatably mounted in said housing, a pair of pole shoes for said armature formed of a ferro-magnetic material and mounted within said housing, a field winding carried by said pole shoes, pole pieces projecting from one side of each of said pole shoes, a movable member formed of a ferro-magnetic material and arranged in the magnetic circuit of the motor in series relation with the poles shoes and armature, said member carried by said housing and cooperating with said pole pieces so as to provide a magnetic path between the pair of sole shoes, braking means operated by said movable member for preventing rotation of said armature, spring means biasing said member in one direction for effecting said braking action and increasing the reluctance of the magnetic circuit of said motor, and said member movable in an opposite direction under the full magnetic force of said field winding for releasing said braking means and decreasing the reluctance of the magnetic circuit of said motor.

2. An electric motor comprising, in combination, a housing formed of a non-magnetic material, an armature rotatably mounted in said housing, a pair of pole shoes for said armature formed of a ferro-magnetic material and mounted within said housing, a field winding carried by said pole shoes, pole pieces projecting from one side of each of said pole shoes, a movable member formed of a ferro-magnetic material and arranged in the magnetic circuit of the motor in series relation with the pole shoes and armature, said member carried by said housing and cooperating with said pole pieces so as to provide a magnetic path between the pair of pole shoes, a disc connected to said armature and arranged to be clamped between said member and the inner surface of said housing so as to brake the rotation of said armature, spring means biasing said member in one direction for effecting said braking action and increasing the reluctance of the magnetic circuit of said motor, and said member movable in an opposite direction under the full magnetic force of said field winding for releasing said disc and decreasing the reluctance of the magnetic circuit of said motor.

3. An electric motor comprising, in combination, a housing formed of a non-magnetic material, an armature rotatably mounted in said housing and having a power output shaft, a pair of pole shoes formed of a ferro-magnetic material, said pole shoes affixed to said housing and projecting radially inward at opposite sides of said armature, each of said pole shoes having a pole piece projecting laterally from the outer ends thereof and adjacent the inner surface of said housing, a field coil wound about the inner portion of each of said pole shoes, guide pins projecting inwardly from one end of said housing, a plate carried by said guide pins and axially movable on the output shaft of said armature, a disc connected to said shaft and axially movable thereon, spring members carried by said guide pins and arranged to bias said plate so as to clamp said disc between said plate and the inner surface of the one end of said housing and thereby prevent rotation of the shaft, said plate cooperating with said pole pieces so that upon energization of the field coil, said plate may be actuated in a direction for releasing said disc and closing the magnetic path between said pair of pole shoes.

JOHN EDWARD COLLINS.
ALFRED JOSEPH MASTROPOLE.

REFERENCES CITED

The following references are of record in the file of this patent:

UNITED STATES PATENTS

| Number | Name | Date |
| --- | --- | --- |
| 1,875,207 | Apple | Aug. 30, 1932 |
| 2,325,915 | Naul | Aug. 3, 1943 |

FOREIGN PATENTS

| Number | Country | Date |
| --- | --- | --- |
| 468,826 | Great Britain | July 13, 1937 |
| 491,469 | Great Britain | Sept. 2, 1938 |

Certificate of Correction

September 27, 1949

Patent No. 2,482,840

JOHN EDWARD COLLINS ET AL.

It is hereby certified that errors appear in the printed specification of the above numbered patent requiring correction as follows:

Column 3, line 36, for the word "poles" read *pole*; line 39, for "sole" read *pole*; and that the said Letters Patent should be read with these corrections therein that the same may conform to the record of the case in the Patent Office.

Signed and sealed this 24th day of January, A. D. 1950.

[SEAL]

THOMAS F. MURPHY,
*Assistant Commissioner of Patents.*